United States Patent [19]
Takeda et al.

[11] Patent Number: 6,006,418
[45] Date of Patent: Dec. 28, 1999

[54] METHOD OF MANUFACTURING A ROTORS WITH PERMANENT MAGNET

[75] Inventors: Masanobu Takeda; Shunichi Tetsui; Yasumasa Mizuno; Hirotaka Yamamoto, all of Kawagoe, Japan

[73] Assignee: Denyo Kabushiki Kaisha, Tokyo, Japan

[21] Appl. No.: 09/095,646

[22] Filed: Jun. 11, 1998

Related U.S. Application Data

[62] Division of application No. 08/598,183, Feb. 7, 1996, Pat. No. 5,828,152.

[30] Foreign Application Priority Data

Feb. 7, 1995 [JP] Japan ................................. 7-19551
Feb. 7, 1995 [JP] Japan ................................. 7-19552
Feb. 7, 1995 [JP] Japan ................................. 7-19553

[51] Int. Cl.[6] .................................................. H02K 15/02
[52] U.S. Cl. ........................................ 29/598; 310/42
[58] Field of Search .............................. 29/598; 310/42, 310/242, 7.01, 7.02, 7.04, 7.08

[56] References Cited

U.S. PATENT DOCUMENTS

| 2,907,903 | 10/1959 | Reijnst et al. | 310/156 |
| 3,221,195 | 11/1965 | Hoffmann | 310/217 |
| 3,463,955 | 8/1969 | Scardina et al. | 310/217 |
| 3,508,095 | 4/1970 | Knudson et al. | 310/156 |
| 4,088,177 | 5/1978 | Armstrong et al. | 310/42 |
| 4,389,589 | 6/1983 | Schustek | 310/258 |
| 4,795,933 | 1/1989 | Sakai | 310/269 |
| 4,910,861 | 3/1990 | Dohogne | 310/43 |
| 4,954,736 | 9/1990 | Kawamoto et al. | 310/156 |
| 5,121,020 | 6/1992 | Bertram et al. | 310/156 |
| 5,175,461 | 12/1992 | Zigler et al. | 310/156 |

FOREIGN PATENT DOCUMENTS

| 60-46757 | 3/1985 | Japan . |
| 62-172268 | 10/1987 | Japan . |
| 5-43751 | 6/1993 | Japan . |
| 6-21346 | 3/1994 | Japan . |
| 6-57055 | 8/1994 | Japan . |
| 6-87636 | 11/1994 | Japan . |

*Primary Examiner*—P. W. Echols
*Assistant Examiner*—John C. Hong
*Attorney, Agent, or Firm*—Jacobson, Price, Holman & Stern, PLLC

[57] ABSTRACT

A rotor with permanent magnet capable of fixing permanent magnets on the rotor iron core by a simple method. This rotor with permanent magnet comprises; a rotor iron core in which rotor iron plates provided with plural recessed portion in trapezoidal form at suitable intervals are formed in stacked manner on the outer circumference, fitting grooves comprised of continuity of the recessed portions on the outer circumferential surface thereof; a pair of end plates provided at respective end surfaces of the rotor iron core; fixing members formed by non-magnetic material, the fixing members being inserted into the respective fitting grooves to form a plurality of areas partitioned by the outer circumferential surface of the rotor iron core along with the end plates; and a plurality of permanent magnets fixed in the respective areas between these fixing members.

4 Claims, 8 Drawing Sheets

METHOD OF MANUFACTURING A ROTORS WITH PERMANENT MAGNET

This is a division application Ser. No. 08/598,183, filed Feb. 7, 1996 now U.S. Pst. 5,828,152.

BACKGROUND OF THE INVENTION

1. Field of the Invention

This invention relates to a rotor iron core of a permanent magnet type generator more particularly, the invention relates to a rotor with permanent magnets in which a plurality of permanent magnets are fixed on the outer circumference of the rotor iron core. A method of manufacturing such a rotor is also part of the invention.

2. Description of the Related Art

Hitherto, the rotors of a permanent magnet type generator, in which permanent magnets are disposed on the outer circumference, have required various methods to facilitate positioning, holding and fixing the permanent magnets. One fixing method is to bond the permanent magnets on the outer circumference of the rotor by winding over the outer circumference a glass tape or the like, impregnated with a semi-hardening resin. The glass tape has the same width as the width of the permanent magnet, and is wound several times in an overlapping manner. Another fixing method is to wind the outer circumference with a tape, such as a clothing tape, having a width narrower than the width of the permanent magnet. The tape may be wrapped with a half-wrap winding to fix the permanent magnets Similar methods have been carried out. Another method of disposing the permanent magnets is to mold the entirety in synthetic resin. This method has also been carried out.

However, in the field of electric rotating machines, rotating machines (such as electric motors and the like) are operated at a high speed in recent years. Accordingly, the centifugal force of the rotor becomes large. As a result, strength has become problem with respect to holding and fixing of the permanent magnet.

For example, in the Japanese Utility Model Application Laid-open No. 57055/1994 publication, there has been proposed a method in which iron plates of the same shape provided with projections at fixed intervals on the outer circumferential surface of the stacked iron core are stacked in the state where corresponding projections of respective iron plates are caused to be respectively in correspondence with each other to form projected stripe portions on the outer circumferential surface to dispose permanent magnets in circular arc form in the state where both side end surfaces are caused to be in parallel to each other between those projected stripe portions to weld the projected stripe portions and the permanent magnet surfaces to fix the permanent magnets on the outer circumference of the rotor iron plates. However, this method requires a complicated step to allow the both side end surfaces of the permanent magnets to be in contact with the projected stripe portions to dispose the permanent magnets between the respective projected stripe portions to fix them by welding, etc. Moreover, in the Japanese Utility Model Application Laid-open No. 21346/1944 publication, there has been proposed a method in which magnets are fitted between projections of fixed intervals formed on the core outer circumference of the rotor iron core to fix a cylindrical cover of resin over the outer circumferential surface thereof so that the entirety is covered.

For example, in the Japanese Patent Application Laid open No. 46757/1985 publication, there has been proposed a rotor in which the field magnetic core and the magnets forming the rotor are bonded and fixed by bond, etc. to wind the outer circumferential side with a bind tape to thermally harden the resin component of the bind tape to cut and grind the bind tape surface to coat varnish on the surface thereof to smooth it. However, it was necessary to carry out a step of forming the outer circumference of each end ring of the both end plates so that it is higher than the finishing surface at the beginning to grind or polish the surface thereof after undergone heating and fusing to implement cutting thereto to smooth it.

Moreover, in the Japanese Utility Model Application Laid-open No. 43751/1993 publication, there has been proposed a fixing method in which rotor plates are stacked to form a field iron core to dispose magnets on the outer circumferential surface side thereafter to dispose end plates on the both ends of the field iron core to fix, by plural caulking pins, the stacked field iron core by the end plates in order to allow it to be firmly put therebetween to wind a metallic bind wire on the outer circumferential surface thereof to clamp the terminating end of the bind wire by the caulking pins of the both side end plates.

In accordance with this method, it was necessary to wind the bind wire thereafter to adjust clamping degree of the field iron core by loosening caulking pins to secure, by winding, the front end of the bind wire to tighten the caulking pins for a second time.

Further, the invention described in the Japanese Patent Publication No. 87636/1994 is directed to a method of manufacturing a rotor with permanent magnet, in which bow-shaped permanent magnets are disposed on the outer circumferential surface of the field iron core to provide resin injection holes at both side end plates to form grooves at the boundary portion between the permanent magnets to wind adhesive tape so as to cover these grooves to cover the boundary grooves thereafter to wind a semi-hardening resin impregnated tape on the outside thereof, and to fill resin into the grooves through the resin injection holes of the end plates to heat the entirety thereof to fuse the resin thereafter to solidify it.

In addition, as for the performance, gap between the rotor and the stator is important. Particularly, the positional shift of the magnet in the rotational axis direction is the great problem that it affects power generating efficiency.

For example, a method described in the Japanese Utility Model Application Laid-open No. 172268/1987 publication is a method in which, in fixing permanent magnets on the rotor body, positioning ring is disposed at the outside of the shaft to hold and fix the permanent magnets on the rotors by the positioning ring to wind a reinforced wire on the outside thereof to further cover the outside thereof by resin, thus to fix the permanent magnets.

In the case of a conventional method of fixing permanent magnets on the outer circumference of the rotor iron core as described above, a plurality of projections are provided on the outer circumference of the rotor iron core to dispose permanent magnets between respective projections to weld projected stripes and the permanent magnets, to wind insulating tape such as glass tape, etc. on the outer circumferential surfaces of the permanent magnets, or to carryout resin molding to cover the outside thereof with resin thus to manufacture the rotor. However, since the permanent magnet is generally comprised of fragile ferrite, etc., when the permanent magnet is forced into the portion between projections on the outer circumferential surface of the rotor iron core, the corner portion of the permanent magnet may be broken because the projection is firm. If the permanent magnet is forcedly thrust thereinto, the permanent magnet may be broken during working. Accordingly, it was necessary to manufacture rotor in the state caused to have clearance between the permanent magnet and the projection in order that the permanent magnet is not caused to come into contact with the projection. For this reason, a method of winding a broad resin impregnated tape, etc. on the outer circumferential surface is carried out in order to prevent the permanent magnet from protruding by the centrifugal force of the permanent magnet. However, in such taping work, there may take place positional shift of the permanent magnet. As a result, it was difficult to manufacture rotor iron core stably rotating. Moreover, the manufacturing process was also complicated in order to guarantee that no positional shift takes place. In addition, a method of disposing permanent magnets thereafter to fit and cover a cylinder over the outer circumferential surface of the entirety of the rotor iron core is also carried out. In this case, however, a cylindrical cover or the like is required, resulting in high cost. The rotor cannot be manufactured at a low cost.

With these conventional fixing methods, there are problems as described below from a viewpoint of preference. Namely, projections of metal system are disposed between permanent magnets disposed on the outer circumference and the entirety is heated. Accordingly, there takes place beads, etc. formed on the surface by fusion owing to heating. For this reason, any gap is required between the stator and the rotor, resulting in magnetic leakage. This was not preferable from a viewpoint of the magnetic efficiency of the generator.

In addition, the conventional rotor iron core is fragile with respect to contact and/or impact. Accordingly, it was the great task to allow permanent magnets to undergo positioning on the field iron core to fix them thereonto in the state where they are not damaged.

SUMMARY OF THE INVENTION

An object of this invention is to improve such conventional troublesome fixing methods to provide a rotor with permanent magnet adapted to fix permanent magnets on the rotor iron core by a simple method.

Another object of this invention is to improve such troublesome fixing methods to provide a manufacturing method for a rotor with permanent magnet by a method of simplicity in which semi-hardening resin impregnated extremely thin thread is wound so that surface finishing treatment after hardening, etc. is not required.

A further object of this invention is to provide a manufacturing method for a rotor with permanent magnet in which after permanent magnets are disposed on the outer circumferential surface of the rotor iron core, the terminating end processing of semi-hardening resin impregnated extremely thin reinforced thread wound on the outer circumference thereof can be carried out by a simple procedure.

In accordance with this invention, the above-mentioned objects can be attained by a rotor with permanent magnet in which a plurality of permanent magnets are fixedly disposed at predetermined intervals on the outer circumference of a rotor iron core, and end plates are disposed on the both sides of the rotor iron core, wherein a plurality of grooves in trapezoidal form are bored and formed at the outer circumference of the rotor iron plates to stack these rotor iron plates to constitute the rotor iron core to insert fixing members of non-magnetic body into the trapezoidal grooves of the stacked rotor iron core to force the permanent magnets into the portions between the fixing members to embed them so that a field magnetic core is provided to dispose the end plates at the both end surfaces in the axial direction of the field iron core to secure the rotor iron plates in a manner to be put therebetween.

Moreover, in accordance with this invention, the above-mentioned objects can be attained by forming, by extraction-molding, the fixing member by synthetic resin to thrust permanent magnets into the portions between the fixing members to embed them thereat. Further, the fixing member is of a structure H-shaped in cross section as a whole such that the both sides of the upper portion thereof are formed narrow toward the center of the lower portion, and the bottom portion thereof is broad in width so as to take trapezoidal shape. Thus, the fixing member is fitted into trapezoidal groove formed on the outside of the rotor iron core and is fixed thereat. Accordingly, the permanent magnet is thrust along the inclined surface from on the fixing member so that it can be subjected to positioning.

Further, as the end plates disposed on the both ends of the rotor iron core in which the rotor iron plates are stacked, end plate provided with a large number of fin pieces, i.e., cooling fins integrally formed by extraction molding may be used. Thus, rotor with permanent magnet of simple structure can be provided.

In accordance with the rotor with permanent magnet, the field iron core is formed by forming trapezoidal grooves at fixed intervals on the outer circumference of the field iron core constituting the rotor to fit and insert fixing members in trapezoidal form of non-magnetic body into the trapezoidal groove formed on the outer circumference of a rotor iron core comprised of stacked iron plates to fix them thereat to thrust permanent magnets into the portions between the fixing members. Thus, quantity of magnetic leakage by the gap produced between permanent magnets can be reduced. Accordingly, the magnetic efficiency is excellent. Thus, compact rotor with permanent magnet is provided. Moreover, since the fixing member is formed by extraction molding by synthetic resin, etc., it is possible to prevent lacking or losing of the projection of the field iron core and the corner of the brittle permanent magnet. Further, the fixing member is caused to take trapezoidal shape and is formed H-shaped in cross section. Accordingly, the permanent magnet is thrust into the portion between fixing members, thus making it possible to fix it thereat after undergone positioning. In addition, since the gap between the field iron core and the permanent magnet of the rotor is caused to be as minimum as possible, positional shift of the permanent magnet during taping work can be prevented. Thus, stable rotor with permanent magnet can be manufactured.

In accordance with this invention, the above-mentioned objects can be attained by a rotor with permanent magnet where end plates are disposed at the both ends of the field iron core in which a plurality of permanent magnets are arranged at predetermined intervals on the outer circumference of the rotor iron core and are fixed thereat to fix the rotor iron core in the state caused to be put between the end plates, wherein rotor ion plates are stacked to form the rotor iron core to dispose end plates at the both end surfaces thereof to integrally extraction-mold, at the insides of the outer peripheral edges of the respective end plates, at the time of manufacturing the end plates, a plurality of projections for fixing the permanent magnets disposed on the outer circumferential surface of the rotor iron core.

Further, the above-mentioned objects can be attained by disposing fin pieces at fixed intervals on the outside surface of the end plate to integrally form them by synthetic resin along with the projections of the inside. In addition, the above-mentioned objects can be attained by an approach in which engagement joints are arranged at the outer periphery of the inside of the end plate in the state engaged with each other so that the permanent magnets can be thrust into the portions between projections of the end plates to further wind a tape of glass on the outer circumferential surface thereof.

As described above, in accordance with the rotor with permanent magnet of this invention, end plates are disposed and fixed at both end surfaces of the rotor iron core comprised of stacked rotor iron plates, and permanent magnets are fitted into the portion between the end plates of the outer circumferential surface, thereby making it possible to firmly fix the permanent magnets by a plurality of projections provided on the inside surface of the end plate. In addition, since the non-magnetic bind member is wound on the outside thereof, positioning of the permanent magnet is securely conducted. Accordingly, there is not any possibility that positional shift takes place even by high speed rotation. Moreover, a plurality of fin pieces are disposed at predetermined intervals on the outside surface of the end plate, resulting in no necessity to additionally provide cooling fin. Particularly, the permanent magnet can be fixed and held by projections disposed inside the end plate. Since this projection is formed by synthetic resin similarly to the end plate, the projection is temporarily deformed when the brittle permanent magnet of ferrite is thrust thereinto. Thus, it is possible to firmly fix the permanent magnet by restoring force of the projection. Thus, even at the time of high speed rotation of the rotor, positional shift of the permanent magnets disposed on the outer circumference can be prevented.

The above-mentioned objects of this invention can be attained by a method of manufacturing rotor with permanent magnet in which a plurality of permanent magnets are fixed on the outer circumference of a rotor iron core to clamp and fix the both ends by the end plates, the method comprising the steps of disposing, at predetermined intervals, permanent magnets in circular arc form on the outer circumferential surface of the rotor iron core comprised of a plurality of rotor ion plates stacked, securing the front end of an extremely thin reinforced thread in which semi-hardening resin is impregnated to a portion of the end plate, densely winding, without gap, the extremely thin reinforced thread on the outer surface of the permanent magnet, heat-hardening the surface of the extremely thin reinforced thread, forming a thin film on the surface thereof, and fixing the permanent magnets. Moreover, the above-mentioned objects of this invention can be attained by a method of manufacturing a rotor with permanent magnet, comprising a stacking step of allowing rotor iron plates to undergo positioning to stack them to form a rotor iron core, an assembling step of disposing end plates having a large number of fin pieces vertically provided at fixed intervals on the outside surface on the both ends in the axial direction of the stacked rotor iron core to insert bolts through bolt penetration holes of the end plates and the rotor iron core, and to insert a rotor shaft into an axial hole formed through these members to hold and fix the end plates by means of bolts and nuts from the both sides, a magnet assembling step of disposing a plurality of permanent magnets in circular arc form at fixed intervals between the both end plates on the outer circumferential surface of the rotor iron core, a winding step of fixing the front end of the semi-hardening resin impregnated extremely thin reinforced thread to the projection projected on the end plate outside surface to densely wind, without gap, the extremely thin reinforced thread onto the outer circumferential surface of the permanent magnet while applying tensile force thereto, and a fusing hardening step of heating the surface covered by the extremely thin reinforced thread to fuse the surface thereofto harden it.

In addition, the above-mentioned objects can be attained by allowing engagement joints to be projected at the peripheral edges of the inside surfaces of the end plates provided with fin pieces at the outside surfaces thereof to allow the rotor iron core to be put between the end plates from the both sides in the axial direction thereof in the state where these engagement joints are opposite to each other to allow engagement portions of the both engagement joints to be engaged with each other to fix the end plates. Particularly, the above-mentioned objects can be attained also by disposing a large number of projections for fixing the permanent magnets at the inside peripheral edges of the end plates to assemble and fix the permanent magnets.

As described above, in accordance with the method of manufacturing the rotor with permanent magnet of this invention, since the rotor iron plates are stacked thereafter to dispose permanent magnets in circular arc form on the outer circumferential surface thereof to densely wind, without gap, the semi-hardening resin impregnated extremely thin reinforced thread in the state put in order on the outer circumferential surface thereof, resin film of which surface is smooth is formed by heat-fusing the surface thereof. For this reason, fixed state of the permanent magnets becomes stable. Moreover, a large number of fin pieces are integrally formed by extraction molding on the outside surfaces of the both side end plates to dispose the end plates at the both end surfaces of the stacked rotor iron core to clamp and fix the rotor iron core by fastening means such as bolt, etc. to dispose permanent magnets at the peripheral spaces between the outer circumferential surface of the rotor iron core and the both end plates to form field iron core to densely wind, without gap, the semi-hardening resin impregnated extremely thin reinforced thread of which front end is clamped by projections of the end plate on the outer circumferential surface side of the permanent magnets to fix the permanent magnets to fuse and harden the extremely thin reinforced thread formed by covering, thus making it possible to manufacture rotor with permanent magnet. Accordingly, the surface is permitted to become smooth differently from broad tape as in the prior art. As a result, surface finishing step such as cutting or machining is not required.

Further, since the extremely thin reinforced thread is wound on the outer circumferential surface, the terminating end processing is simpler and winding tension is smaller as compared to the conventional broad tape. The winding width can be easily adjusted by the number of winding times. The thickness is permitted to be constant by regular winding as a whole.

Further, since the end plates provided with fin pieces are used, there is no necessity of attaching and disposing cooling fin except for the end plates. Moreover, the permanent magnets are integrally secured on the outer circumferential surface of the stacked rotor iron core by the end plates along with fixing of the end plates such as bolt or nut, etc. In addition, the semi hardening resin impregnated extremely thin reinforced thread is caused to undergo regular winding in a spiral form on the outer circumferential surface thereof. Accordingly, such extremely thin reinforced thread can be densely wound without gap. Thus, there is provided a manufacturing method in which the surface is smoothly hardened when heated and hardened within the drying furnace, stable quality can be obtained from a viewpoint of strength, and mass production is easily conducted.

BRIEF DESCRIPTION OF THE DRAWINGS

In the accompanying drawings:

FIG. 14 is an enlarged explanatory view of an embodiment of a method of holding extremely thin reinforced thread terminating portion in the manufacturing method of this invention, wherein FIG. 15 is an enlarged explanatory view of the essential part of another embodiment of a method of holding extremely thin reinforced terminating portion, wherein

DETAILED DESCRIPTION OF THE PREFERRED EMBODIMENTS

Respective preferred embodiments according to this invention will now be described with reference to the attached drawings.

Figure 1:
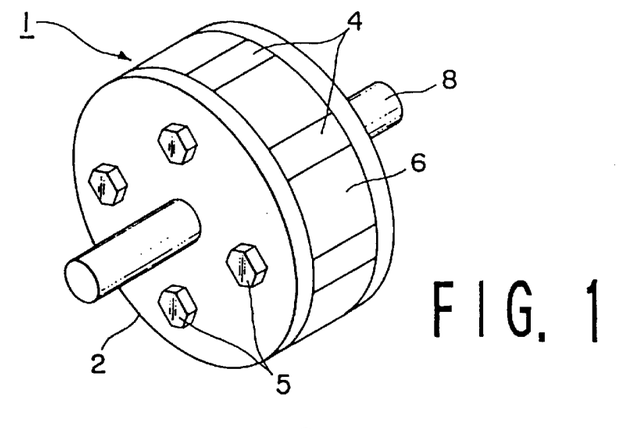
FIG. 1 is a perspective view of a first embodiment of a rotor with permanent magnet of this invention.
Figure 2:
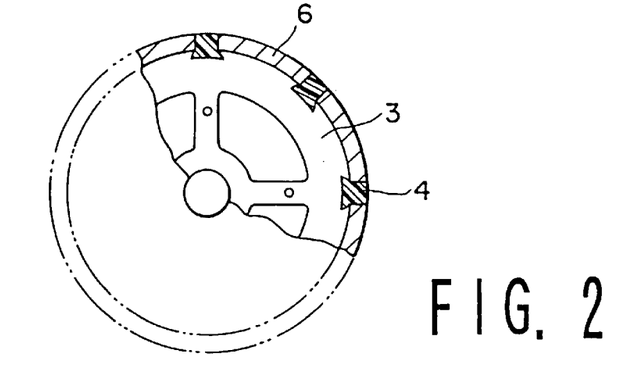
FIG. 2 is a partial cross section of FIG. 1.
Figure 3:
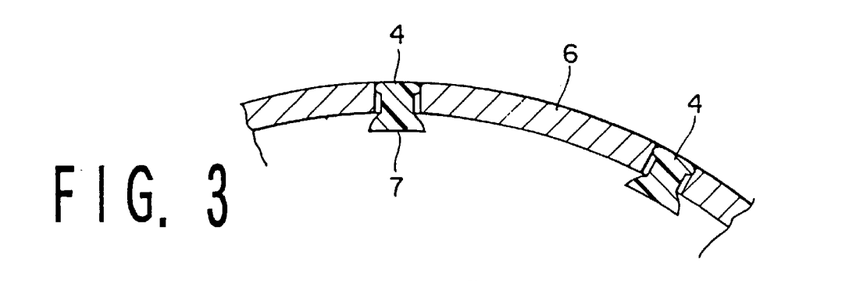
FIG. 3 is an enlarged view of the essential part of FIG. 2.
Figure 4:
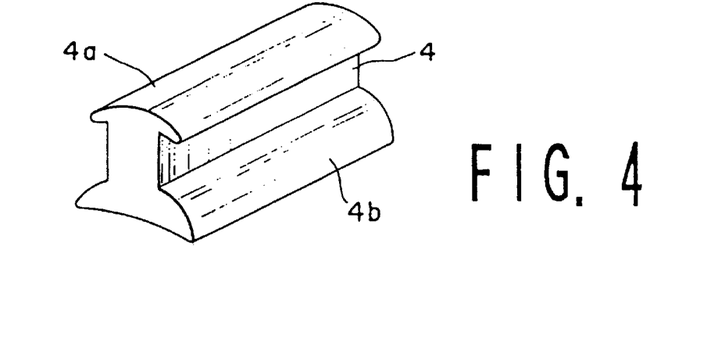
FIG. 4 is a perspective view of fixing member of resin embedded in the rotor with permanent magnet.
Figure 5:
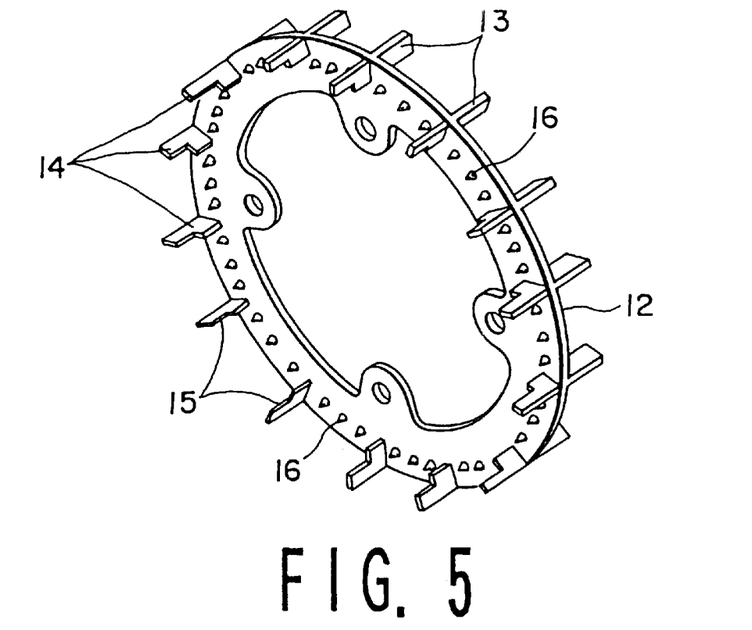
FIG. 5 is a perspective view of end plate showing a second embodiment of the rotor with permanent magnet of this invention.
Figure 6:
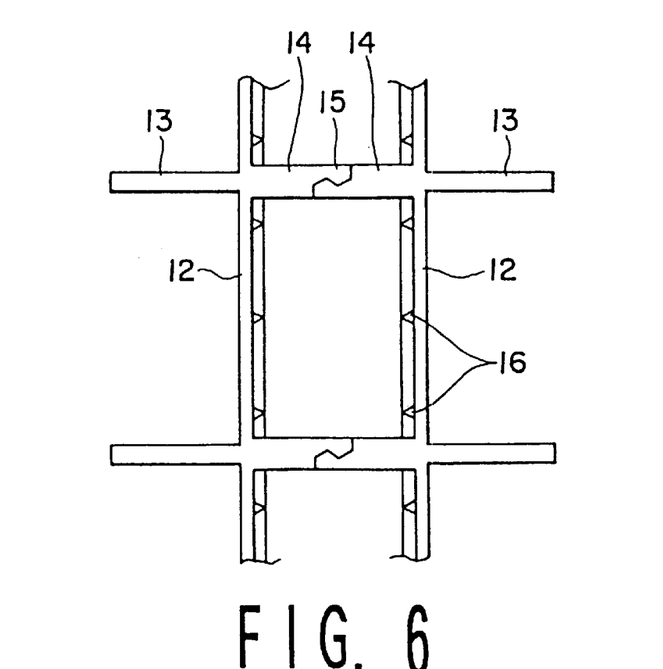
FIG. 6 is an enlarged plan view of the essential part of the rotor with permanent magnet of the second embodiment.
Figure 7:
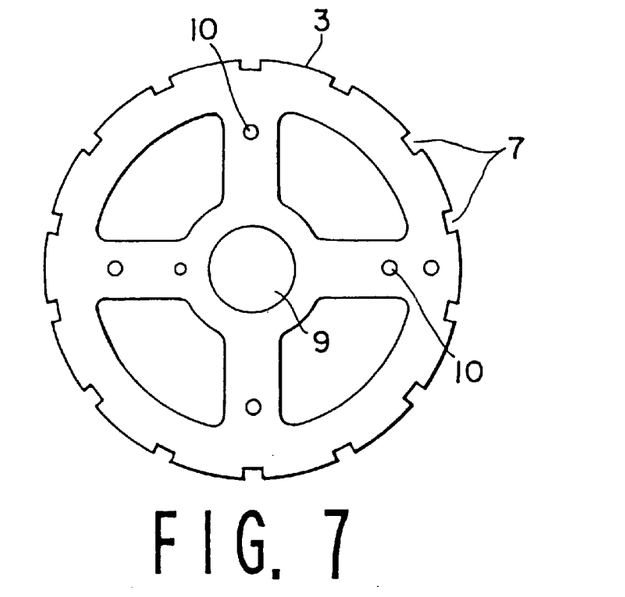
FIG. 7 is a front view of rotor iron plate used in this invention.

FIG. 1 is a perspective view of a rotor with permanent magnet of this invention, and FIG. 2 is a partial cross sectional view of FIG. 1. FIG. 3 is an enlarged view of the essential part of FIG. 2, and FIG. 4 is a perspective view of a fixing member of resin embedded in the rotor with permanent magnet. FIG. 5 is a perspective view of an end plate showing a second embodiment of the rotor with permanent magnet of this invention. FIG. 6 is an enlarged plan view of the essential part of the rotor with permanent magnet of the second embodiment. FIG. 7 is a front view of a rotor iron plate used in this invention.

Explanation will be given below in connection with the structure in accordance with the embodiment of the rotor with permanent magnet of this invention.

A rotor body 1 is formed by staking rotor iron plates 3, 3 . . . comprised of thin iron plate to clamp the rotor iron plates 3, 3 . . . and fixing members 4, 4 . . . disposed at fixed intervals on the outer circumferential surface thereof by end plates 2, 2 of the both sides thereof to fix them by means of bolts 5, 5. . . . The fixing member 4 may have any cross sectional shape without being specified. The fixing member 4 can be manufactured by extraction-molding by using synthetic resin having elasticity such as nylon, etc. For example, the fixing member 4 may be formed H-shaped in cross section as shown in FIG. 4. More particularly, the upper portion 4a is caused to be an inclined surface such that the both sides are formed narrower toward the center of the lower part, and the bottom portion 4b is caused to be broad so that it has trapezoidal shape. Reference numeral 6 denotes permanent magnets fixed after undergone positioning in the areas between the fixing members 4, 4 . . . disposed on the outer circumferential surface of the stacked rotor iron plates 3, 3. . . . Reference numeral 7 denotes recessed portions in trapezoidal form formed at fixed intervals on the outer circumference of the rotor iron plate 3 to form fitting grooves when the rotor iron plates 3 are stacked. The bottom portions 4b of the fixing members 4, 4 . . . are fitted and inserted into these fitting grooves. Reference numeral 8 denotes a rotor shaft of the field iron core.

The rotor with permanent magnet thus formed is fixed as follows. Namely, the rotor shaft 8 is inserted into a rotor shaft hole of the rotor iron core formed by stacked the rotor iron plates 3, 3 . . . to fit it into a set groove to fit and insert the fixing member 4, 4 . . . into the fitting grooves 7 in trapezoidal form of the outer circumferential surface. The end plates 2, 2 are caused to be held or clamped from both sides so that the rotor iron core is put therebetween to clamp them by means of bolts 5, 5 . . . to fix them. Then, permanent magnets 6, 6 . . . are thrust into the spaces formed by the fixing members 4, 4 . . . and end plates 2, 2 along the inclined surfaces of the upper portions 4a of the fixing members 4 and are thus filled thereinto. In this way, the permanent magnets 6, 6 . . . are fixed between fixing members 4, 4 of the entire circumference after undergone positioning. These permanent magnets 6, 6 . . . are fixed by projections of upper portions 4a of the fixing members 4, 4. . . . Then, a non-magnetic insulating tape such as glass tape, etc. in which resin, etc. is impregnated is wound on the outer circumferential surfaces of the permanent magnets 6, 6 and the fixing members 4, 4 . . . to heat the entirety of the field iron core within a heating furnace such as drying furnace, etc., thus making it possible to prevent the permanent magnets 6, 6 . . . from protruding by fusion of resin.

A second embodiment of the rotor with permanent magnet of this invention will now be described with reference to FIG. 5.

Reference numeral 12 denotes molded end plates disposed at the both ends in the state where the rotor iron plates 3, 3 . . . are stacked and provided with fins 13 . . . protruded toward the outside. A plurality of beam bodies 14, 14 . . . are projected at the outer peripheral edge of the inside. Engagement joints 15 are formed at the front ends of these beam bodies 14, which are respectively engaged with engagement joints 15 of the beam bodies 14 of the end plate 12 of the opposite side. This engagement performs the same role as the fixing member 4 of the first embodiment (see FIG. 6). Projections 16 which press magnet are formed at the inside of the outer peripheral edge of the molded end plate 12.

In the second embodiment, molded end plates 12, 12 are disposed at the both sides of the stacked rotor iron plates 3, 3 . . . to allow the engagement joints 15 and the engagement joints 15 of the respective frame bodies 14 to be engaged with each other to firmly clamp the rotor iron plates 3, 3. . . . Then, permanent magnets 6, 6 . . . are forcedly thrust into the areas encompassed by the beam bodies 14, 14 and molded end plates 12, 12 along the inclined surfaces of the upper portions to fix the permanent magnets 6 at the outside of the rotor iron core formed by the rotor iron plates 3, 3 . . . , thus to form the field iron core. Thus, it is possible to manufacture rotor with permanent magnet by winding glass tape, etc. on the outer circumferential surface in the same manner as in the first embodiment. The field iron core in which such glass tape is wound is heated within the drying furnace to fuse synthetic resin to permit the surface to be smooth. The end plates 12, 12 of the second embodiments are formed by synthetic resin, etc., whereby they can be manufactured by extraction molding, etc. in the state where the beam bodies 14 and/or fins 13, etc. are integrated.

Since the rotor with permanent magnet of this invention is constituted as above, the permanent magnets are thrust into the fixing frame comprised of synthetic resin, whereby positioning operations of the permanent magnets are carried out with ease. In addition, since the fixed frame is formed by synthetic resin having flexibility, the permanent magnets can be fixed with no possibility that damage such as lacking or loosing, etc. takes place in fitting the permanent magnets. In this case, the non-magnetic body is disposed between the permanent magnets, leakage magnetic flux between magnets can be as minimum as possible. Thus, power generating efficiency can be improvided.

Figure 8:
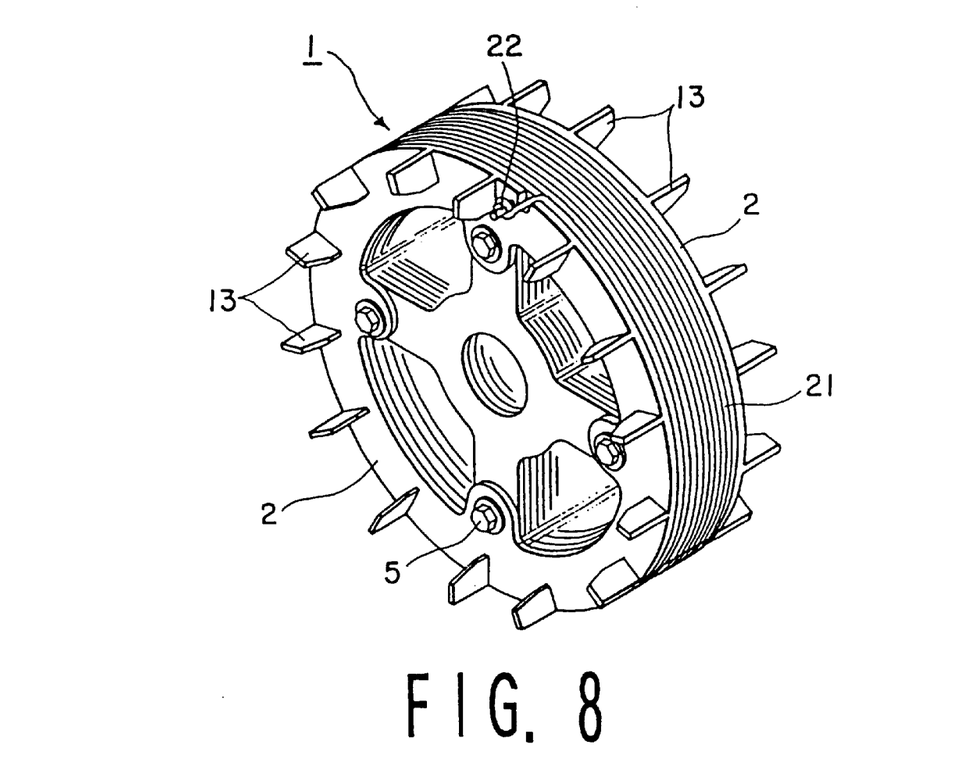
FIG. 8 is a perspective view of a further embodiment of the rotor with permanent magnet of this invention.
Figure 9:
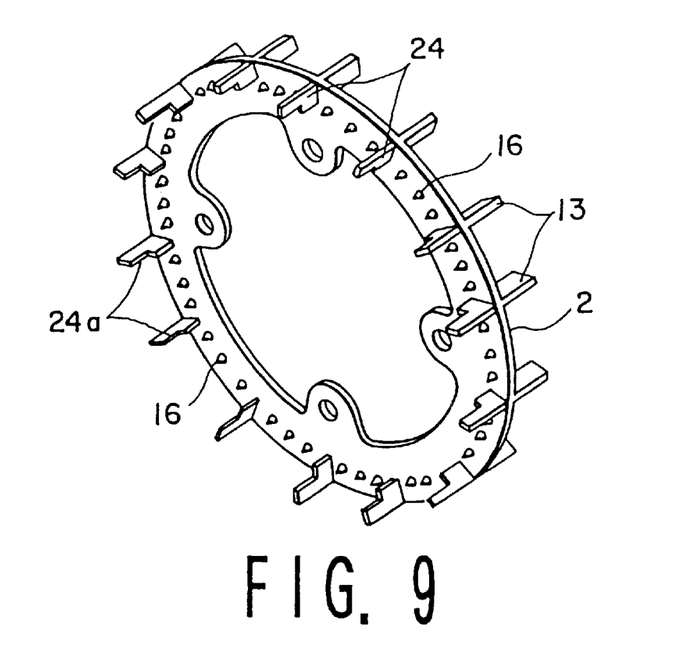
FIG. 9 is a perspective view of end plate of the embodiment of the rotor with permanent magnet of this invention.
Figure 10:
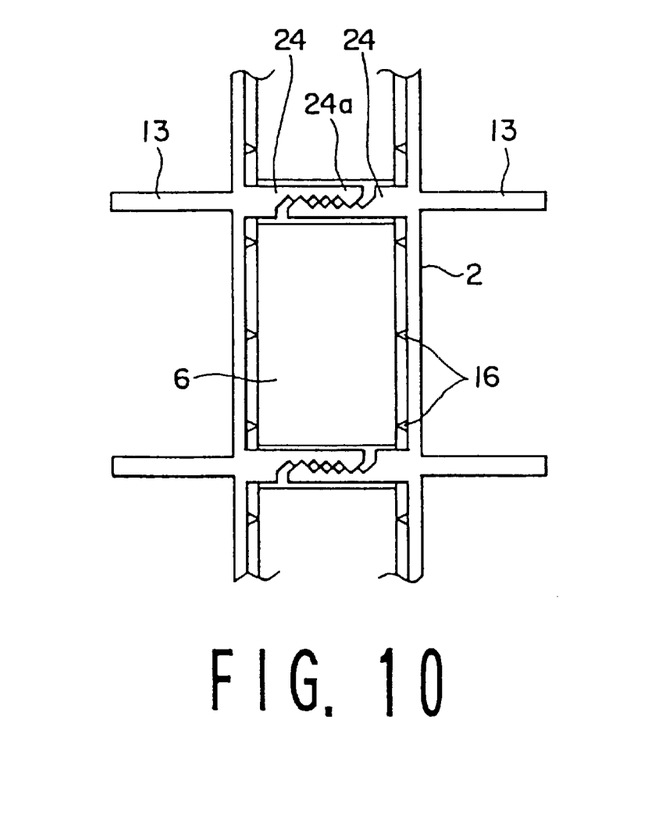
FIG. 10 is an enlarged cross sectional view of the essential part according to another embodiment of end plate.

FIG. 8 is a perspective view of another embodiment of the rotor with permanent magnet of this invention. FIG. 9 is a perspective view of end plate of another embodiment of the rotor with permanent magnet of this invention. FIG. 10 is an enlarged cross sectional view of the essential part according to another embodiment of the end plate.

The structure will now be described in accordance with the embodiment of the rotor with permanent magnet of this invention.

The rotor body 1 is formed by stacking rotor iron plates to allow the stacked rotor iron plates to be put between end plates 2, 2 disposed on the both end surfaces to fix them by means of bolts 5, 5. . . . The end plate 2 is integrally extraction-molded in the state where a plurality of fin pieces 13, 13 . . . are disposed at fixed intervals on the outside surface and projections 23, 23 . . . are vertically provided at the outer peripheral edge of the inside surface. Reference numeral 24 denotes engagement joints for engaging the end plates 2, 2, and engagement portions 24a are respectively formed at the front end portions thereof. As this engagement portion 24a, a plurality of engagement teeth may be arranged as shown in FIG. 10 in place of single engagement tooth. In this case, the engagement position can be adjusted by the thickness of the rotor iron core put between the end plates. These engagement joint 24 are engaged with each other so that the rotor iron plates are firmly put between both end plates 2, 2. Engagement portions 24a of the engagement joints 24 are engaged and fixed by bolts 5, 5 to wind a bind member 21 such as a glass tape, etc. in which synthetic resin of non-magnetic body is impregnated, or the like on the outer circumference thereof to form rotor body 1. Reference numeral 22 denotes a terminating processing portion for fixing-processing the terminating end of the bind member 21.

The rotor with permanent magnet of this invention formed in this way undergoes the following steps. Namely, after the rotor iron plates are stacked, end plates 2, 2 are disposed at the both end surfaces of the rotor iron plates to allow the engagement portions 24a of the engagement joints 24 projected on respective end plates 2, 2 are engaged with each other so that they are fixed to insert bolts 5, 5 . . . therethrough to allow the rotor iron plates to be fixedly put between the end plates 2, 2. Then, the permanent magnets 8 are thrust and fixed between the end plates 2, 2 on the outer circumferential surface of the rotor iron plates. At this time, the permanent magnets 6 are caused to undergo positioning by projections 16, 16 . . . projected toward the internal surface side of the end plates 2, 2. Thus, they are securely held and fixed. In addition, these permanent magnets 6 are permitted to undergo positioning in the circumferential direction also by the engagement joints 24.

Since the rotor with permanent magnet of this invention is constituted as above, positioning of the permanent magnets thrust into the portions between the end plates can be simply carried out by projections vertically provided on the inside surfaces of the end plates comprised of synthetic resin. In addition, since plural projections have elasticity, this fixing method is suitable for fixing the permanent magnet. Further, since those projections are formed by synthetic resin having elasticity, the permanent magnets can be fixed with no possibility that damage such as lacking or losing, etc. takes place in the work for inserting and fitting the permanent magnets. In addition, since non-magnetic bodies are disposed between the permanent magnets, leakage magnetic flux between magnets can be as minimum as possible. Thus, the power generating efficiency is improved.

Figure 11:
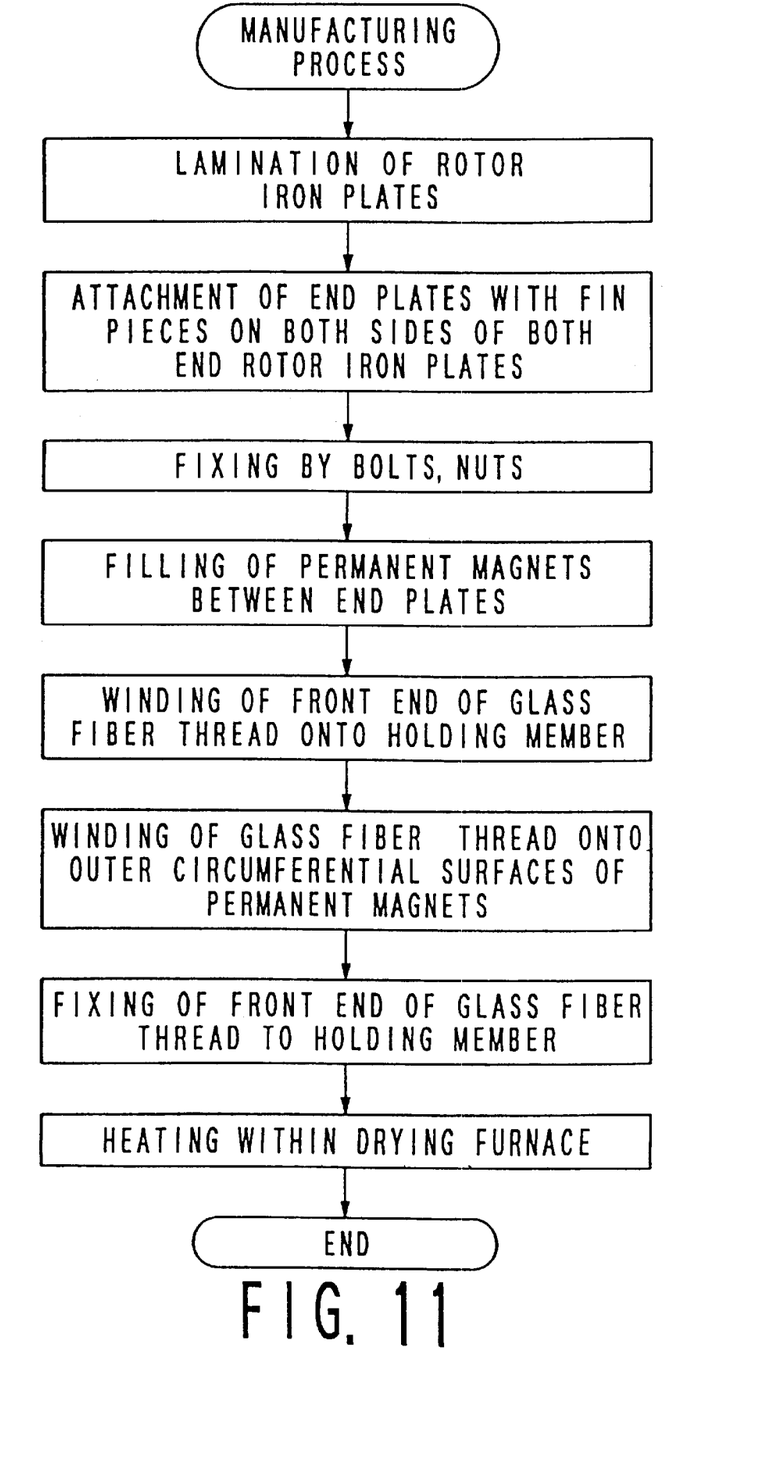
FIG. 11 is a flowchart of a method of manufacturing the rotor with permanent magnet of this invention.
Figure 12:
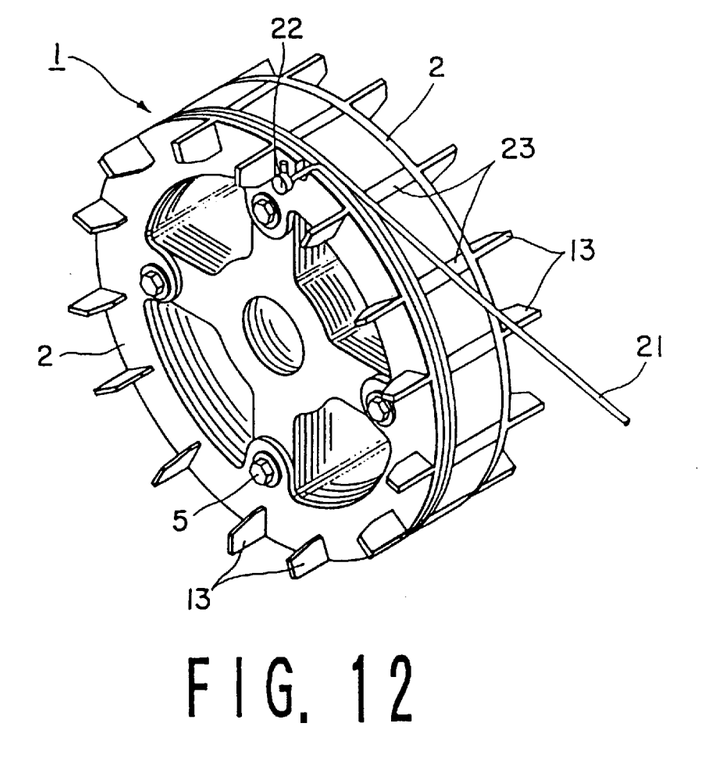
FIG. 12 is a perspective view showing a method of winding extremely thin reinforced thread in the method of manufacturing rotor with permanent magnet of FIG. 8, FIG. 13 an enlarged cross sectional view of the essential part showing the state before the extremely thin reinforced thread of the rotor with permanent magnet of FIG. 8 is wound.
Figure 13:
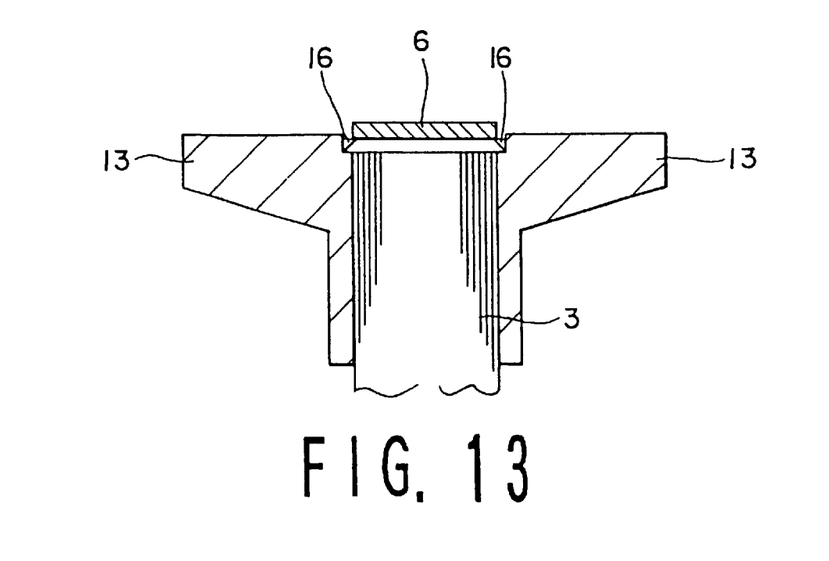
Figure 14A:
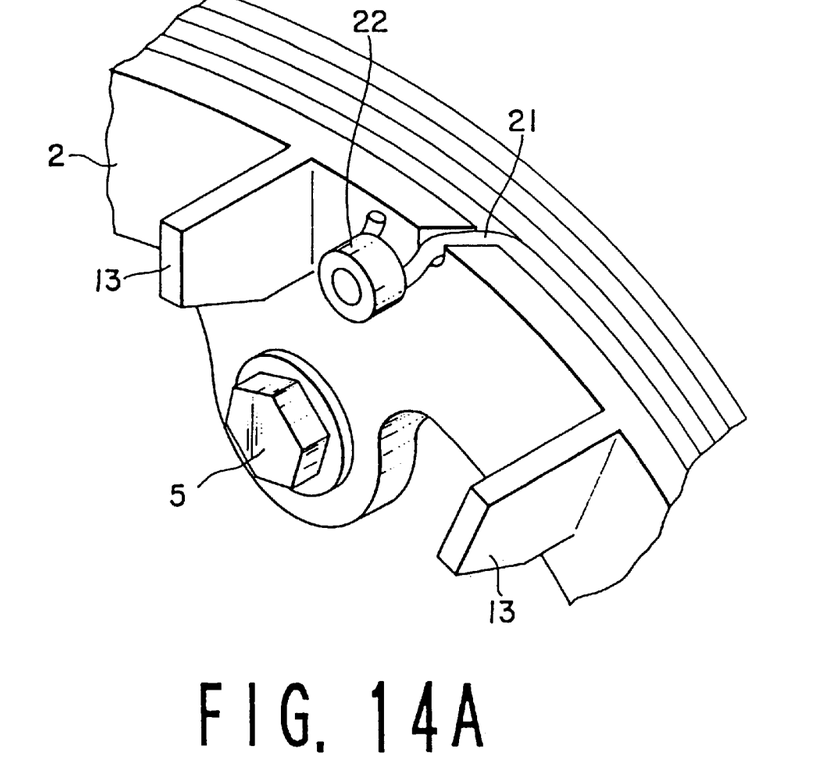
FIG. 14A is an enlarged perspective view of the essential part.
Figure 14B:
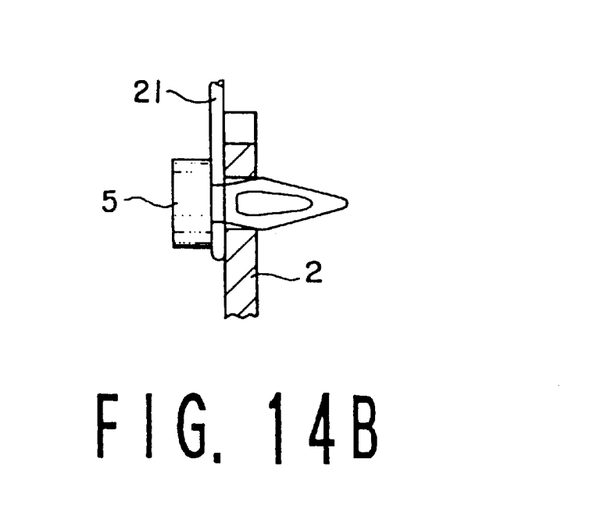
FIG. 14B is an enlarged cross sectional view of holding portion.
Figure 15A:
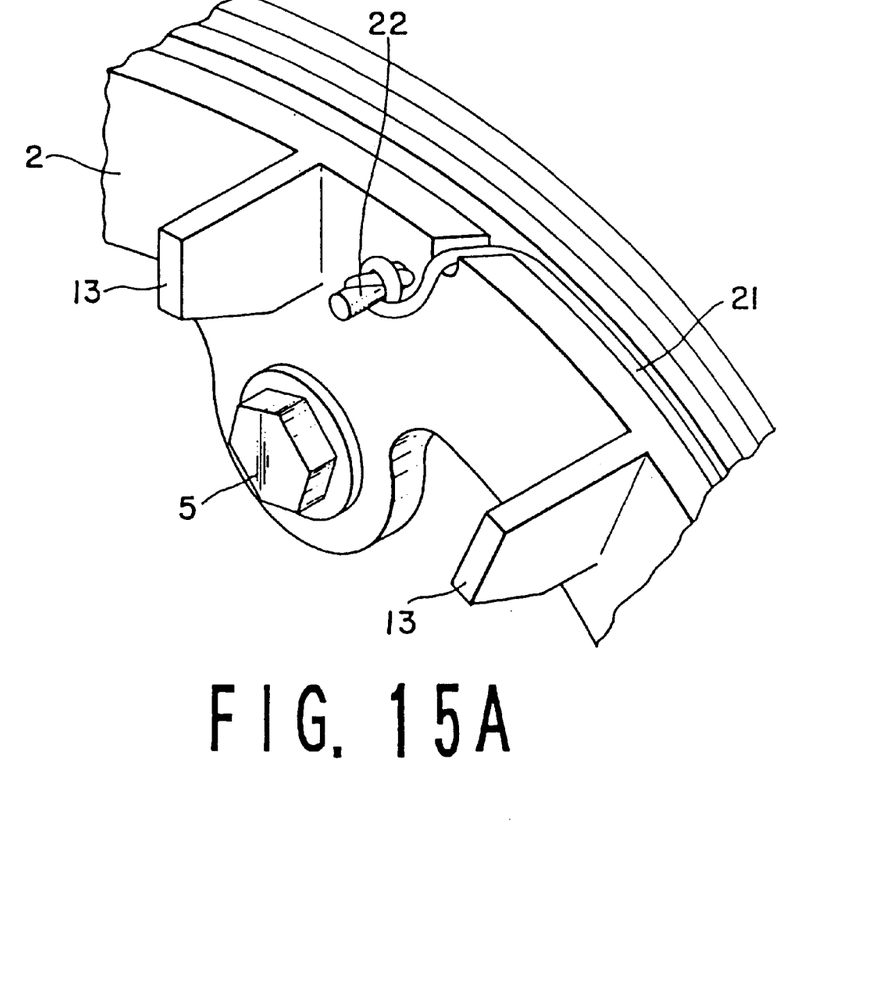
FIG. 15A is an enlarged perspective view of the essential part.
Figure 15B:
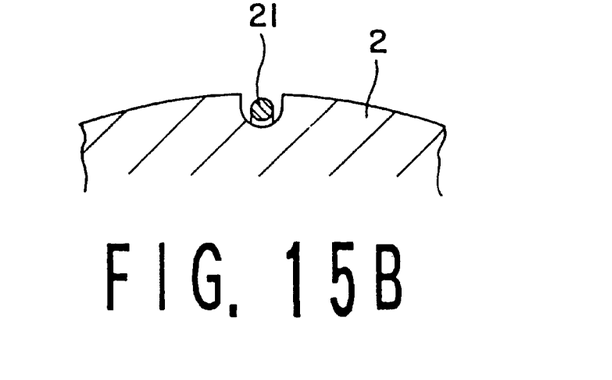
FIG. 15B is an enlarged cross sectional view of the essential part.

FIG. 11 is a flowchart of a method of manufacturing the rotor with permanent magnet of this invention. FIG. 12 is a perspective view showing a method of winding extremely thin reinforced thread in the method of manufacturing the rotor with permanent magnet of FIG. 8. FIG. 13 is an enlarged cross sectional view of the essential part in the state before the extremely thin reinforced thread of the rotor with permanent magnet is wound. FIG. 14 is an enlarged explanatory view of an embodiment of a method of holding the extremely thin reinforced thread terminating end in the manufacturing method of this invention, wherein FIG. 14A is an enlarged perspective view of the essential part and FIG. 14B is an enlarged cross sectional diagram of the holding portion. FIG. 15 is an enlarged explanatory view of the essential part of another embodiment of the method of holding the extremely thin reinforced thread terminating end, wherein FIG. 15A is an enlarged perspective view of the essential part, and FIG. 15B is an enlarged cross sectional view of the essential part.

An embodiment of a rotor with permanent magnet manufactured by the method of manufacturing the rotor with permanent magnet of this invention will now be described.

As shown in FIG. 7, rotor iron plates 3 having grooves 7 of which cross section is trapezoidal bored at the outer circumferential surface and fixing bolt penetration holes 10 . . . and axial hole 9 at the central portion are stacked to allow the end plates 2, 2 to be in contact with both end sides in the axial direction of the stacked rotor iron plates 3 to dispose permanent magnets 6 of which cross section is bow-shaped on the outer circumferential surface of the stacked rotor iron plates 3 to constitute rotor body 1. At the end plate 2, a large number of fin pieces 13 . . . are vertically provided at predetermined intervals on the outside surface, and a holding member 22 is bored at a portion of the peripheral portion. This holding member 22 is comprised of screw rod or nylon fastner. In addition, the end plate 2 is integrally extraction-molded in the state where a large number of projections 16 . . . are projected at the portion in the vicinity of the outer peripheral edge of the inside surface of the end plate 2.

Since the permanent magnet 6 is made up by well known sintered alloy such as ferrite, etc., it is very brittle and is easy to adsorb metallic powder, etc. by magnetic force. Accordingly, attention must be drawn to handling. Reference numeral 24 denotes engagement joints projected at the inside surfaces of the both end plates 2, 2, and engagement portions 24a are respectively formed at the front end portions thereof. By allowing the both engagement joints 24 to be engaged with each other, the rotor iron plates 3 are caused to be firmly put between the both end plates 2, 2. The engagement portions 24a of the engagement joints 24 are engaged with each other so that they are fixed to fix both end plates 2, 2 by bolts 5 or nuts, etc. thereafter to use glass fiber thread 21 as semi-hardening resin impregnated non-magnetic extremely thin reinforced thread to wind the front end of the glass fiber thread 21 on the holding member 22 of the end plate 2 to densely wind, without gap, the glass fiber thread 21 on the outer circumferential surface of the permanent magnet 6. The holding member 22 of the end plate 2 may be a member in which nylon fastener is inserted into a hole bored at a portion of the end plate 2 as shown in FIG. 14B.

A method of manufacturing the rotor with permanent magnet of this invention will now be described.

A predetermined number of rotor iron plates 3 as shown in FIG. 7 are stacked so that they have predetermined thickness to engage engagement portions 24a . . . of the engagement joints 24 . . . protruded toward the inside of the fixing frame or the end plate 2 into the grooves 7 in trapezoidal form formed on the outer circumferential surface thereof to fix them to allow the rotor iron plates 3, 3 . . . to be put therebetween. Namely, the rotor iron plates 3, 3 . . . are assembled by the end plates 2, 2 with fin pieces 13 disposed on the both outsides thereof in the state where caused to be put therebetween. Then, bolts 5 are inserted into bolt penetration holes 10 . . . to fasten and fix them by means of nuts, etc. In this way, the rotor iron plates 3, 3 . . . can be integrally fixed by the end plates 2, 2. Then, the permanent magnets 6 are thrust into the portions between end plates 2, 2 on the outer circumferential surface of the rotor iron plates 3. Further, they are lightly driven in, e.g., by means of wood hammer, etc. to securely hold and fix them by projections 16 . . . vertically provided at the inside edges of the end plates 2, 2.

Then, the front end of the glass fiber thread 21 in which semi-hardening resin is impregnated is wound on the holding member 22 provided at the outside surface of the end plate 2 and is held thereat to fit it into embedded groove of the end plate 2 to densely wind it on the outer circumferential surfaces of the permanent magnets 6 to wind and fix its terminating end at the holding member 22.

For example, as shown in FIG. 14, the winding start portion of the glass fiber thread 21 is wound on the holding member 22 of nylon fastener to fit it into the embedded groove provided at the outer circumference of the end plate 2 thereafter to densely wind it on the surface of the permanent magnets 6 and the engagement joints 24 as shown in FIG. 12 to cover the entire outer circumferential surface of the permanent magnets 6 thereafter to wind the terminating end of the glass fiber thread 22 on the holding member 21 to thereby to fix the glass fiber thread to heat it so that the entirety is firmly secured.

The entirety of the rotor body 1 covered by the glass fiber thread 21 is inserted into a drying furnace to heat it at a predetermined temperature for a predetermined time thereafter to take out it therefrom. As a result, the semi-hardening resin is fused and hardened at the surface of the permanent magnet 6. Thus, a thin resin film is formed. Namely, the glass fiber thread 21 and the entirety of the surface of the rotor body 1 are covered by the resin film. Thus, the permanent magnets 6 can be firmly fixed and held. Moreover, at this time, the terminating end of the glass fiber thread 21 is molten in the state wound on the holding member 22. Thus, it is firmly fixed. Therefore, there is not any possibility that loosening of thread takes place also on the entire circumference and at the terminating end even by high speed rotation of the rotor of the generator, etc.

The method of holding the front end of the glass fiber thread 21 onto the holding member 22 is not limited to the method shown in FIG. 13. For example, such end portion can be simply fixed by a method of winding the glass fiber thread 21 on the holding member 22 integrally formed with the end plate 2 as shown in FIG. 15A.

In accordance with the method of manufacturing the rotor with permanent magnet of this invention, the semi-hardening resin impregnated extremely thin thread such as glass fiber thread, etc. is wound and covered on the outer circumferential surfaces of the permanent magnets disposed on the outer circumferential surface of the field magnetic core to heat it so that film surface in film form is formed on the outer circumferential surfaces of the permanent magnets. Accordingly, work for cutting or machining the surface, or carrying out trimming, etc. is not required. Thus, rotor having smooth surface can be provided. In addition, the permanent magnets can be firmly held and fixed. As a result, the gap between the stator and the rotor can be as narrow as possible. Thus, power generators of high efficiency can be manufactured.

What is claimed is:

1. A method of manufacturing a rotor, comprising:

a stacking step of positioning rotor iron plates and stacking the rotor iron plates to form a rotor iron core, the rotor iron core having an outer circumferential surface and an axial direction;

an assembling step of disposing a pair of end plates, each end plate having an outside surface, an inside surface, and a circumferential edge, each end plate having a plurality of fin pieces vertically provided at fixed intervals on the outside surface, each end plate being disposed at one of the ends of the rotor iron core in the axial direction, each end plate and the rotor iron core having bolt penetration holes and an axial hole, bolts being inserted into the bolt penetration holes of the end plates and of the rotor iron core, a rotational shaft penetrating through the axial holes of the end plates and of the rotor iron core, both end plates being clamped and fixed by the bolts and by a plurality of nuts;

a magnet assembling step of disposing a plurality of permanent magnets in a circular arc form, each magnet having an outer circumferential surface and a pair of side surfaces, the magnets being disposed at fixed intervals between the end plates on the outer circumferential surface of the rotor iron core to form a field iron core;

a winding step of securing a front end of a reinforced thread onto a holding projection, the reinforced thread having a width which is extremely thin relative to the width of the magnets, the reinforced thread being impregnated with a semi-hardening resin, the holding projection projecting from the outside surface of one of the end plates, and winding the reinforced thread densely, without gaps between successive windings, on the outer circumferential surfaces of the magnets, while applying tensile force to the reinforced thread; and a fusion hardening step of heating the reinforced thread and the outer circumferential surfaces of the magnets to fuse and harden the semi-hardening resin.

2. The method of manufacturing a rotor as set forth in claim 1, wherein the inside surface of each end plate has a plurality of engagement joints projecting from the inside surface at the circumferential edge, each engagement joint has a front end, each engagement joint has an engagement portion at the front end of the engagement joint, and the engagement portions of the engagement joints of both end plates engage with each other, so that the engagement joints clamp and fix the rotor iron core between the end plates.

3. The method of manufacturing a rotor as set forth in claim 2, wherein:

the inside surface of each end plate has a plurality of inside projections at the circumferential edge, and the inside projections fix the side surfaces of the magnets;

each engagement joint and each fin piece is integrally formed with one of the end plates, and each engagement joint has an outer circumferential surface;

the front end of the reinforced thread is clamped by the holding projection, and the reinforced thread is wound on the outer circuferential surfaces of the engagement joints as well as the outer circumferential surfaces of the magnets; and in the fusion hardening step the entirety of the field iron core is heated, and the semi-hardening resin forms a thin film which fixes the permanent magnets.

4. The method of manufacturing a rotor as set forth in claim 2, wherein each fin piece, each holding projection, and each engagement joint is integrally extraction-molded with one of the end plates, and each end plate is composed of a plate resin material, the plate resin material including a synthetic resin.

* * * * *